Feb. 21, 1956 H. P. FIEBER 2,735,476
CRASH SEAT

Filed Jan. 4, 1955 2 Sheets-Sheet 1

Herman P. Fieber
INVENTOR.

Feb. 21, 1956 H. P. FIEBER 2,735,476
CRASH SEAT
Filed Jan. 4, 1955 2 Sheets-Sheet 2
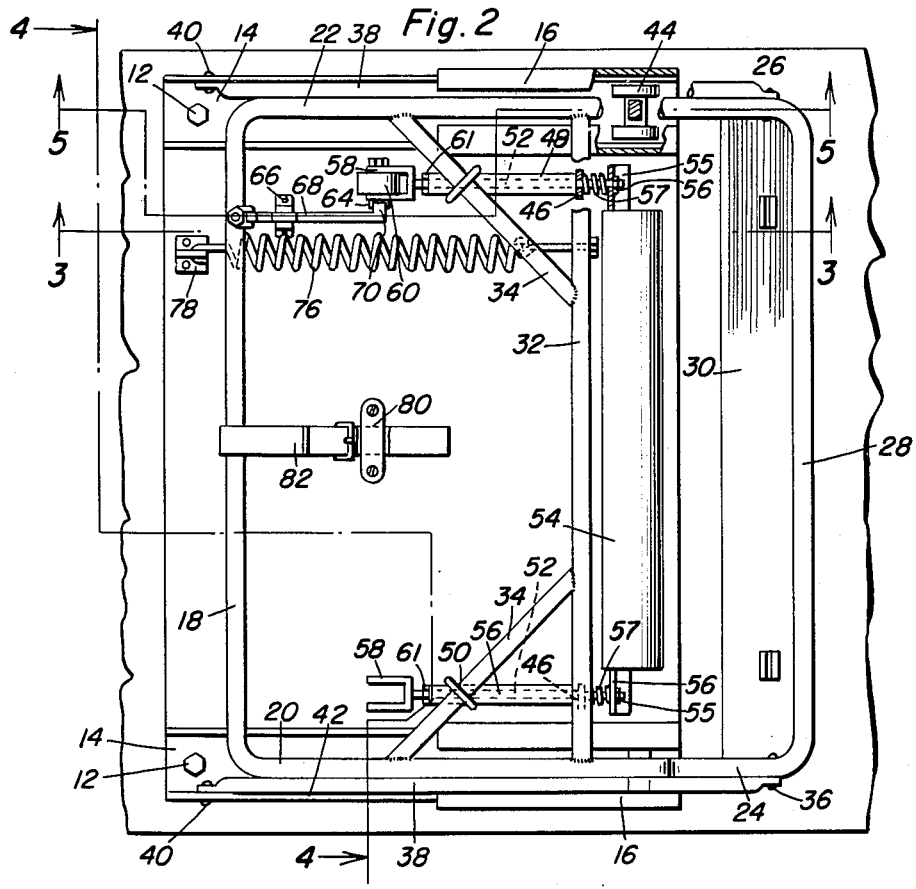
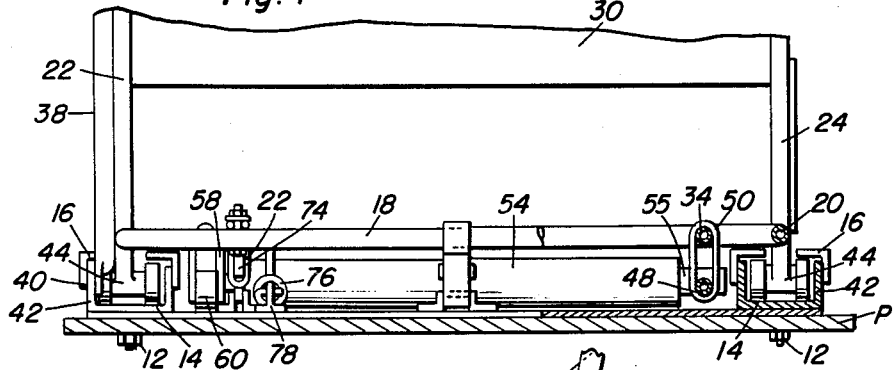
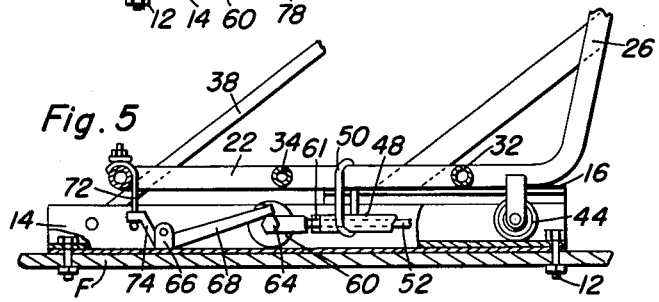
Herman P. Fieber
INVENTOR.

United States Patent Office
2,735,476
Patented Feb. 21, 1956

2,735,476

CRASH SEAT

Herman P. Fieber, Toledo, Oreg.

Application January 4, 1955, Serial No. 479,824

6 Claims. (Cl. 155—9)

This invention relates to safety or crash seats for the protection of an occupant of a vehicle during a collision and the resultant sudden impact therefrom and although adaptable for other uses it will be discussed in particularity with respect to its use with a motor vehicle.

A sudden impact in a collision generally results in the occupants of the vehicle being suddenly thrown forward, causes serious and often fatal cuts, head and spine injuries.

Thus the primary object of this invention is to provide a crash seat for a vehicle which includes means actuated by a sudden impact on said vehicle, which immediately permits the front edge portion of the seat to move upward resulting in a major portion of the force of inertia on the occupant of the seat to be absorbed in the seat and thus reducing the possibility of injury to the occupant.

Another object of the invention is to provide a crash seat in a vehicle which as a result of sudden impact to said vehicle will move forward with the occupant of the seat in an upward movement causing a major portion of the force on the occupant due to said impact to be absorbed in said seat and reducing the possibility of injury to the occupant of said seat.

And yet another object of the invention is to provide a safety seat in a vehicle which includes a pivoted seat of which the forward edge portion defines an upward pivotal path during pivotal movement of said seat, and includes impact actuated trigger means which permits and causes the upward pivotal movement of said seat, reducing the possibility of injury to an occupant of said seat during the occurrence of said impact.

These together with other objects and advantages will become subsequently apparent reside in the details of construction and operation as more fully hereinafter described and claimed, reference being had to the accompanying drawings forming a part hereof, wherein like numerals refer to like parts throughout, and in which:

Figure 2 is a top plan view of the seat, the seat cushions being removed, with parts broken away;

Figure 4 is a partial sectional view taken substantially on line 4—4 of Figure 2 showing in detail the front view of the trigger mechanism in a latched or cocked condition; and Figure 5 is a sectional view taken substantially on line 5—5 of Figure 2 showing the seat in a position similar to that of Figure 1, and the position of the trigger mechanism in a latched or cocked condition.

Figure 1:
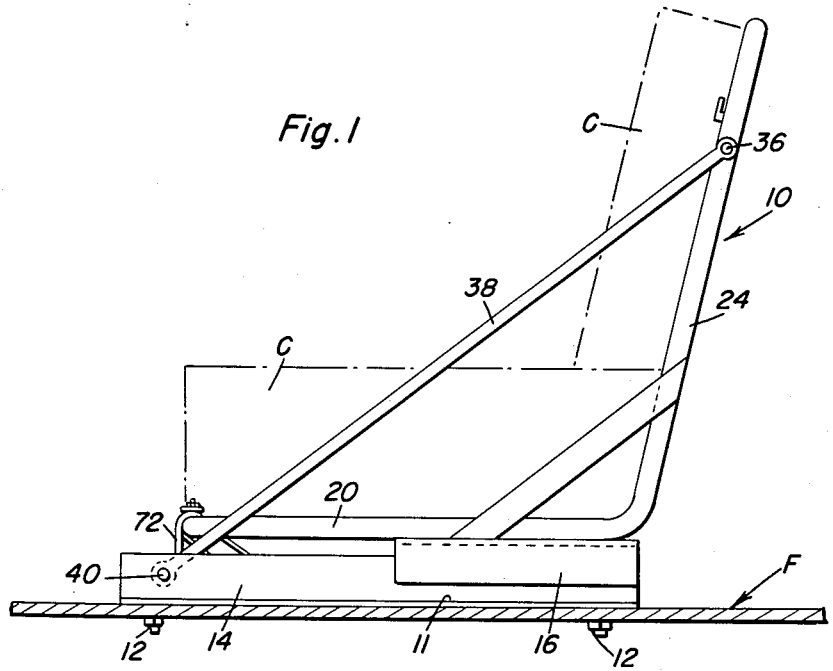
Figure 1 is a side elevational view of the crash seat in an upright position, which is the position of normal use, the seat cushion being shown by phantom lines.

The crash seat is indicated generally at 10 and is secured to the floor F of a vehicle and has suitable cushions C mounted thereon in any suitable manner.

Secured to a metal plate 11 adjacent the floorboard of the vehicle in any suitable manner, for example, by means of bolts 12, are a pair of parallel U-shaped channel members 14 which include integral inwardly directed flange portions 16 on one end. The seat includes a transverse front edge tubular portion 18 connected to a pair of rearwardly extending parallel bottom side elements 20 and 22 which terminate in upward extending back side elements 24 and 26 which are connected together by a transversely extending back element 28. Disposed between the upwardly extending side elements 24 and 26 and the transversely extending top portion 28 of the back portion of the seat is a suitable cushion supporting element 30 to which will be connected the back cushion C. Connected to the bottom side elements 22 in spaced parallel relationship to the front edge portion 18 is a transverse bracing element 32 which has secured between it and the side elements 20 and 22 suitable angularly related bracing elements 34, which are secured, for example, by welding.

Figure 3:
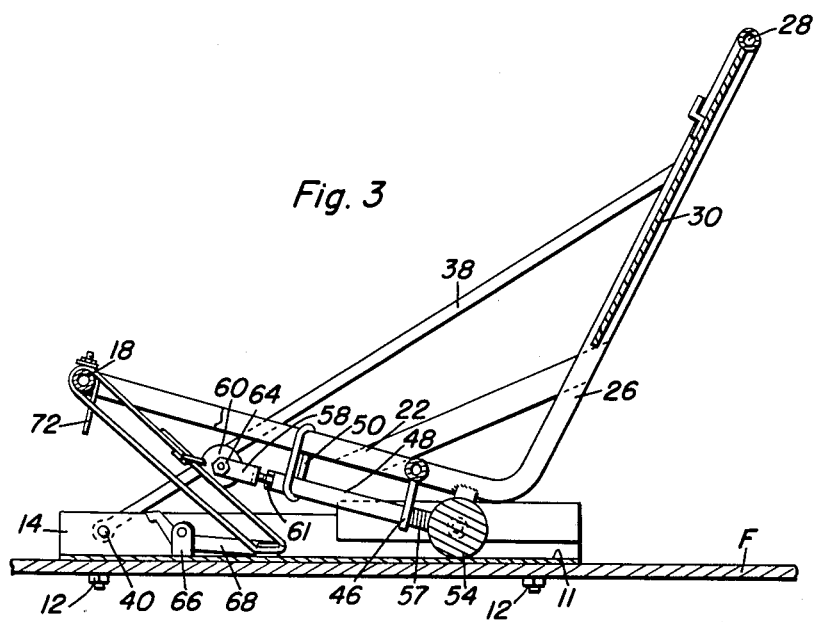
Figure 3 is a sectional view taken substantially on line 3—3 of Figure 2 showing the crash seat after actuation of the trigger mechanism.

Secured on an intermediate portion of the back elements 24 and 26 by means of a pivot pin 36 is a pivotal connecting rod 38 which has its other end pivotally secured at 40 to the outer flange portion 42 of the parallel U-shaped channel members 14. Thus, it can be seen, without referring to the support structure and trigger mechanism to be subsequently described, that the seat frame may pivot from a position shown in Figure 1 to the position shown in Figure 3 wherein during the accomplishment of said movement the forward edge element 18 and a bottom seat thereon moves in an upward pivotal direction having a scooping action during pivotal movement of said frame.

Reciprocable within the inturn flange portion 16 of the U-shaped channel members 14 are seat supporting and pivotal roller assemblies 44 which are suitably journalled on the lower rear portions of the side elements 20 and 22 as seen in Figure 4.

Extending downwardly from the transverse brace element 32 are suitably spaced bracket elements 46 (Figures 2 and 3), which support one end of a tubular guide element 48, the tubular guide element being supported intermediately by means of a suitable shackle element 50 carried by the brace 34. Extending through the guide element 48 is a trigger rod 52, the rear end of which being reciprocably carried by a bracket 46 and being reciprocably connected to a trigger weight 54. It will be noted that the weight 54 includes integral side flanges 55 through which the rear end of the rod 52 passes being retained thereon by means of a nut 56 secured to the flanges 55, and a compression spring 57 is interposed between the brackets 46 and the flanges 55. The rod 52 extends forwardly out of the guide element 48 and has secured thereon a bifurcated yoke 58 carrying a roller element 60 adjacent the forward end of the guide element 48, and on the forward portion of the rod 52 is an adjusting nut 61 for positioning the roller and yoke for a purpose to become subsequently apparent. As observed in Figure 2, only one of the roller members 60 are disclosed, however, it should be readily apparent that two roller members 60 could be utilized with the trigger mechanism to be described, or the roller 60 could be journalled in the yoke 58 shown at the lower portion of Figure 2 and the trigger mechanism could be located adjacent element 20 of the seat frame.

The rollers 60 and 44 are generally in contact with the surface to which the crash seat is attached, the roller 60 being journalled on an axle in the bifurcated yoke and being retained thereon by outwardly extending nuts 64 as seen for example in Figures 2 and 5. A pivotal support bracket 66 is secured to the floor adjacent the forward edge element 18 and has pivotally mounted therein a latch lever 68 having an angular portion 70 extending over the nuts 64 when the latch mechanism is in a cocked position. Connected to the forward edge element 18 opposite the latch element 68 is a suitable loop element 72 which is secured thereon in any suitable manner, and when in the cocked condition the latch element includes an upwardly and forwardly extending portion 74 which extends therethrough, as clearly seen in Figure 5.

Secured on an intermediate portion of the transverse rod element 32 is one end of a tension spring 76 which has its other end secured to a suitable bracket member 78 attached to the plate 11 on the floor of the vehicle in any suitable manner. Secured to said plate on the floor of the vehicle between the side elements 20 and 22 by means of a bracket 80 is an adjustable stop belt 82, of any suitable material, which extends over the front edge element 18. The belt 82 is adjustable as a stop means to control the maximum extent of upward pivotal movement after actuation of the device to prevent excessive tipping of the seat.

The operation of the device is as follows:

After a predetermined adjustment of the stop belt 82, the forward portion 74 of the latch element 68 will extend within the loop 72 and the rearward portion of the latch element 68 will extend over the nut 64 of the roller 60. The device is said to be in a cocked position, which is prior to actuation due to an impact which might be caused, for example, from a collision with another vehicle. In the event a collision occurs, the passenger sitting on the cushion C would immediately tend to be thrown forward due to the force of inertia. When an accident occurs of the character just described, the weight 54 is also instantaneously thrown toward the forward portion due to inertia, said forward movement of the weight 54 causing the seat frame to move in an upward scooping direction whereupon forward movement of the nut 64 due to forward movement of the trigger rod under the portion 70 of the latch element 68 permits the pivotal upward movement of the forward edge element 18 of the frame and accordingly similar movement of the bottom cushion C which is movable therewith. This upward pivotal movement, which might be called a scooping action, is aided by the tension spring 76. This upward pivotal movement, as previously mentioned, is the result of the pivotal connection of the rod 38 being connected at the pin 36 to the side frame elements 24 and 26 and to the flange 42 of the channel elements 14. Thus it is seen that the tension spring 76 is an additive force to the force of inertia on the weight 54 which causes the trigger mechanism to be unlatched and the aforementioned scooping movement. This upward scooping movement is practically instantaneous after the impact of a collision and continues after the impact thereof raising the forward portion of the lower cushion upwardly, wherein a person sitting in the seat will be accompanied by the pivotal movement of the seat frame and the tendency to be thrown forward will be impeded, if not stopped, and the aforementioned force of inertia on said person will be absorbed by the seat cushion itself.

Although it has been disclosed that a tension spring could be incorporated with the weight element 54, it is to be considered within the purview of this invention to incorporate other force additive means such as air pressure, hydraulic pressure, vacuum steam, electric, etc.

The terms "front," "rear," "right," "left" or any other positional direction terms are intended to have only a relative connotation to aid in describing the device and are not intended to be interpreted as requiring any particular orientation with respect to any external elements.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. For use in a motor vehicle, a pair of substantially parallel guide elements secured to a vehicle floor, a seat frame including a bottom and back portion pivotally carried by said guide elements, means connected between the back portion of said seat and said guide elements to permit said seat frame to pivot upwardly, an impact responsive weight operably secured to said seat frame, latch means operably associated between said seat frame and vehicle floor for immediate actuation by said impact responsive weight, and means operably connected between said vehicle floor and said seat frame for preventing excessive upward pivotal movement of said seat frame.

2. For use in a motor vehicle, a pair of substantially parallel guide elements secured to a vehicle floor, a seat frame including bottom and back portions pivotally carried by said guide elements, means connected between the back portion of said seat and said guide elements to permit said seat to pivot upwardly, an impact responsive weight operably secured to said seat frame, latch means operably associated between said vehicle floor and said seat frame for actuation by said impact responsive weight, means connected between said vehicle floor and said seat frame for restraining excessive upward pivotal movement of said seat frame during an impact, and means operably associated between said vehicle floor and said seat frame for adding to the force of the impact responsive weight to urge said seat in an upward direction.

3. A safety seat for use in a vehicle, including a pair of substantially parallel U-shaped guide elements secured to a vehicle floor, a seat frame including bottom and back portions pivotally carried by said guide elements, connecting elements between the back portion of said seat frame and said guide elements for permitting said seat frame to attain an upward pivotal movement, transversely extending trigger weight means carried on said seat frame, roller elements carried on the bottom portion of said seat frame in said guide elements, a trigger rod carried by said frame extending between said weight and a roller assembly carried at one end of said rod, a pivotal latch element carried on the floor of the vehicle having one end operably associated with a portion of said roller assembly, the latch element having a forwardly extending portion for connection to a downwardly extending latch portion carried by said seat frame, whereby upward pivotal movement of said seat frame due to impact force on said weight causes the disengagement of the latch element from the downwardly extending latch portion of the seat frame.

4. A safety seat as set forth in claim 3 wherein an adjustable stop means element is secured to a forward portion of said seat frame and to the vehicle floor for preventing excessive upward pivotal movement of said seat frame.

5. In a safety seat as set forth in claim 4 wherein force means are operatively secured between said seat frame and said vehicle floor for urging said seat frame in an upward pivotal direction.

6. A seat frame as set forth in claim 5 wherein said force means consists of a tension spring.

References Cited in the file of this patent

UNITED STATES PATENTS

| | | |
|---|---|---|
| 2,433,950 | Henderson | Jan. 6, 1948 |
| 2,660,222 | Woodsworth | Nov. 24, 1953 |

FOREIGN PATENTS

| | | |
|---|---|---|
| 217,733 | Great Britain | June 26, 1924 |
| 663,379 | France | Apr. 8, 1929 |
| 1,005,756 | France | Jan. 2, 1952 |